Feb. 15, 1966   N. R. HAMM   3,235,287
CUSHIONED PUSHER MECHANISM FOR VEHICLES
Original Filed June 26, 1961   13 Sheets-Sheet 11

INVENTOR
Norman R. Hamm

BY *Strauch, Nolan & Neale*
ATTORNEYS

Feb. 15, 1966   N. R. HAMM   3,235,287
CUSHIONED PUSHER MECHANISM FOR VEHICLES
Original Filed June 26, 1961   13 Sheets-Sheet 12

INVENTOR
Norman R. Hamm

BY

ATTORNEYS

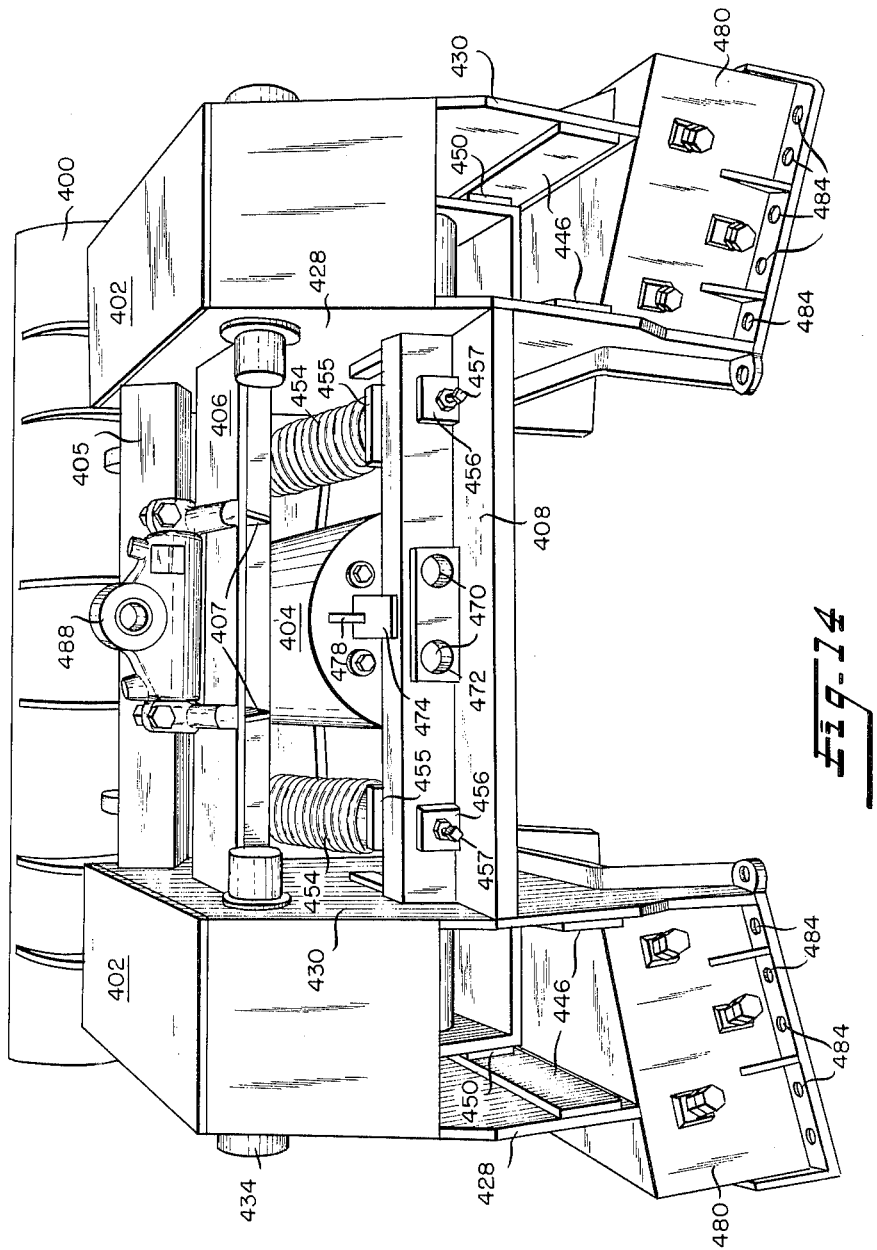

United States Patent Office 3,235,287
Patented Feb. 15, 1966

3,235,287
CUSHIONED PUSHER MECHANISM FOR
VEHICLES
Norman R. Hamm, Perry, Kans., assignor to Rockwell
Manufacturing Company, Pittsburgh, Pa., a corporation
of Pennsylvania
Continuation of application Ser. No. 119,730, June 26,
1961. This application Aug. 25, 1964, Ser. No. 393,479
16 Claims. (Cl. 280—481)

This application is a continuation of copending application No. 119,730, now abandoned filed June 26, 1961, which is a continuation-in-part of application Serial No. 848,822 filed October 26, 1959.

This invention relates to pusher attachments for vehicles, and particularly to pusher attachments for transmitting a driving force from a driving vehicle to a driven vehicle, as from a tractor vehicle to a dirt scraper and hauling vehicle, wherein the vehicles are normally subjected to high impact shocks in and during the push engagement.

The present invention is particularly adapted for use in connection with implements in grading and earth moving, wherein dirt scrapers or the like consist of a trailer scraper body supported at one end on a wheeled axle and at the other end on a traction vehicle. During the scraping action, the scraper body is lowered into contact with the ground and a load of dirt is scraped into the scraper body, and the body is thereafter elevated and the load of dirt is hauled away. In such equipment, the power needed for scraping or excavating is much greater than is needed for hauling, and usually the traction vehicle constituting a part of the scraper has power sufficient to haul the dirt, but insufficient to effect self-loading. Therefore, an auxiliary power vehicle, such as a tractor, is employed to assist in the scraping and loading action.

It is common practice to provide a pusher block usually called a stinger at the rear end of the scraper for engagement by a push plate or member supported by heavy framework in the front of the auxiliary power vehicle. Normally the scraper is substantially stalled before the auxiliary vehicle traveling at a speed in the order of 8–10 miles per hour rams into the scraper to dislodge it from its stalled position and start it on a forward path. Initial engagement of the stinger and push plate results in shock loads of considerable magnitude being imposed on the heavy equipment. Such sudden shock loads have caused severe damage to the driven and driving vehicles as well as to the equipment operators. In the past, some operators of the auxiliary push tractor, to avoid the effects of the sudden impact, carefully maneuvered the push tractor with a slow approach thereof to the scraper to minimize the shock; however, this had the obvious disadvantage of resulting in loss of time in making contact and loss of productive work from both the scraper and push tractor.

Prior art pushing devices have resulted in injury to workmen and equipment primarily because they have been incapable of providing an adequate cushioning effect to the shock loads encountered in use, and yet permit quick and efficient transmittal of the pushing forces. This has been remedied by the persent invention which utilizes a shock absorber comprised of a fluid containing cylinder having a movable piston therein connected to the rear of the push plate. Rearward force on the plate transmitted to the piston forces the fluid through ports in the cylinder wall extending into a fluid reservoir. Escape of fluid from the cylinder controlled by the arrangement of ports, thereby offers desirable controlled shock absorption of the forces applied to the push plate while maintaining pushing engagement between the tractor and the earth moving vehicle until the desired dirt load has been picked up and the loaded vehicle pulls away from the pushing tractor.

To effect the foregoing functioning, a novel arrangement of ports in the cylinder wall causes initial impact piston movement to quickly close a relatively large total area of ports from fluid communication with the fluid reservoir to absorb and cushion the impact energy applied to the push plate and to bring the piston to equilibrium position in the cylinder. When the equilibrium position of the piston has been reached, the push plate will be maintained in constant contact with the stinger of the driven vehicle until the latter gains sufficient speed to pull away from the pushing vehicle.

After the pushing cycle is completed the push plate is returned by resilient members to its initial impact position. During the return movement, the resistance to piston movement provides a reverse cushioning effect for the stored return spring energy which is terminated as the piston passes over all of the ports open to the reservoir on its forward side in a manner providing rapid cushioned return of the push plate to complete the cycle of operation of the mechanism.

The effects of the shock absorber and arrangement of ports in the cylinder thereof are therefore:

(1) Rapid dissipation of shock loads applied to the push plate;

(2) Cooperation with the return springs by offering slight initial push plate return resistance whereby the push plate is maintained in contact with the stinger even though the stinger may apply loads of varying magnitude against the push plate; and (3) A reverse cushioning effect on the attachment as plate return resistance is built up slowly and then increased suddenly near the end of the return stroke towards the end of absorption of the energy stored in the springs during the pushing cycle.

Accordingly, a primary object of the present invention is to provide a pusher mechanism which gradually absorbs and cushions high impact and shock loads applied to earth loading and moving vehicles and the like to effect rapid engagement and controlled transmittal of the pushing force to the pushed vehicle and reversely controlled return movement of the mechanism at the end of the pushing cycle.

Another object of this invention is to provide a novel hydraulic shock absorber adapted to cushion impact loads in one direction of movement and to provide controlled reverse cushioning in its opposite direction of movement.

A further object is to provide an universally mounted shock absorbing mechanism secured to an impact receiving member and mounting means therefor in which the shock absorbing mechanism is retained in substantially the same position relative to the mounting means and impact member throughout movement of the latter.

Other objects of the present invention are to provide a pusher structure for cushioning the engagement shock of a driving vehicle with a driven vehicle; to provide a pusher plate and mounting structure therefor on a driving vehicle with said plate supported for movement toward and away from said vehicle substantially in a linear path and a shock absorbing member retarding such movement; to provide such a structure wherein a support member is secured to the driving vehicle and pivoted levers or links connect said support and a pusher plate for parallel movement of the pusher plate; to provide such a structure with resilient members to urge the pusher plate away from the driving vehicle or resist movement of the pusher plate imparted by engagement of the driven vehicle; to provide such a structure with plate supporting members at each side thereof and rigidly connected whereby said pusher plate move substantially uniformly on both sides even though the pushing force is primarily exerted in laterally spaced relation from the center of the pusher plate; to provide such a structure with a shock cushioning hydraulic cylinder and piston with a plurality of flow passages or orifices communicating with the cylinder along the length thereof whereby movement of the piston in the cylinder reduces the number of flow passages through which the flow may be discharged and thereby increases the flow resistance and the force required for further movement of the piston in the cylinder; to provide such a structure wherein the cylinder is surrounded by a reservoir to maintain a supply of fluid to fill the cylinder at all times; to provide a pusher plate mounting structure which movably supports the plate without binding and a hydraulic shock absorber that provides substantially positive or solid pushing engagement at the end of the shock absorbing motion of said plate; to provide pusher structure adapted to be mounted directly on the front of a vehicle, or on other forward elements thereof, as for example the C-frame of a tractor; and to provide a shock cushioning pusher structure and mounting therefor which is economical to manufacture, positive in operation and substantially trouble-free.

Other objects and advantages of this invention will become apparent from the following description taken in connection with the accompanying drawings, wherein are set forth by way of illustration and example certain embodiments of this invention.

FIGURE 14 is a rear perspective view of the embodiment of this invention illustrated in FIGURE 11.

Figure 1:
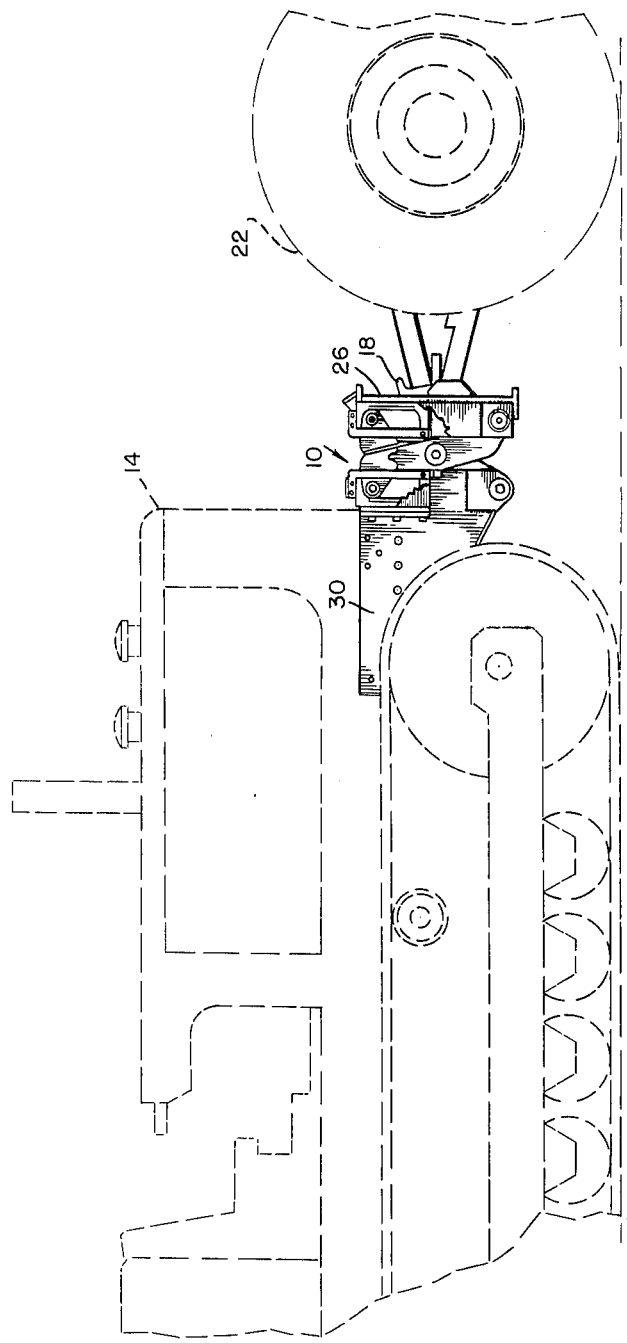
FIGURE 1 is a side elevation of a pusher structure in pushing relation between a driving and driven vehicle, said vehicles being shown in broken lines and with portions of the pusher structure broken away to illustrate the position of the pivoted links therein.

The preferred embodiment of this invention is shown as a pusher attachment indicated generally as 10 mounted on a tractor 14 which may be of conventional design and is shown in broken lines in FIGURE 1 as a track-laying type tractor. It is, of course, to be understood that the pusher attachment embodying the invention may be applied to other types of driving vehicles or moving members. The pusher structure is adapted to be engaged with a push block 18 of a driven vehicle 22 which may be of any conventional structure, such as a scraper or the like, with the push block 18 suitably supported in rearwardly extended relation therefrom.

The pusher structure includes a push plate 26 supported on tractor 14 by laterally spaced support plates 30 and 34 secured to the main frame of tractor 14, preferably at the forward end thereof. Plates 30 and 34 are rigidly connected by a plurality of spaced transverse members 38, 42 and 44, illustrated as being two tubes and a channel member respectively, by transverse ribs 48 secured to channel member 44, and by a plate member 52 secured to the bottom edges 58 of the plates 30 and 34 and extending between the transverse members 38 and 44 to form a rigid support structure. The upper forward portions of plates 30 and 34 are connected by transverse member 42 which is preferably of tubular form.

Figure 2:
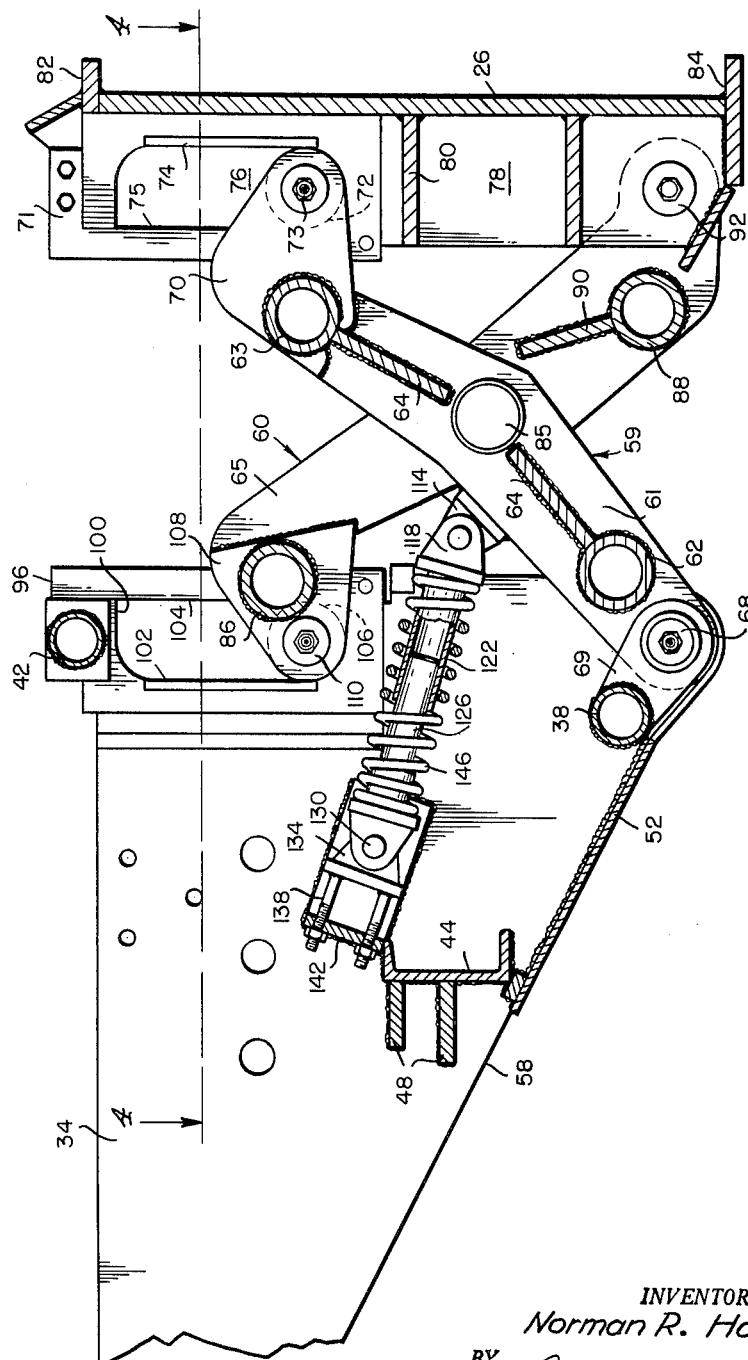
FIGURE 2 is a vertical sectional view through the pusher structure shown in FIGURE 1 with the plate in extended position taken on line 2—2 of FIGURE 4.
Figure 3:
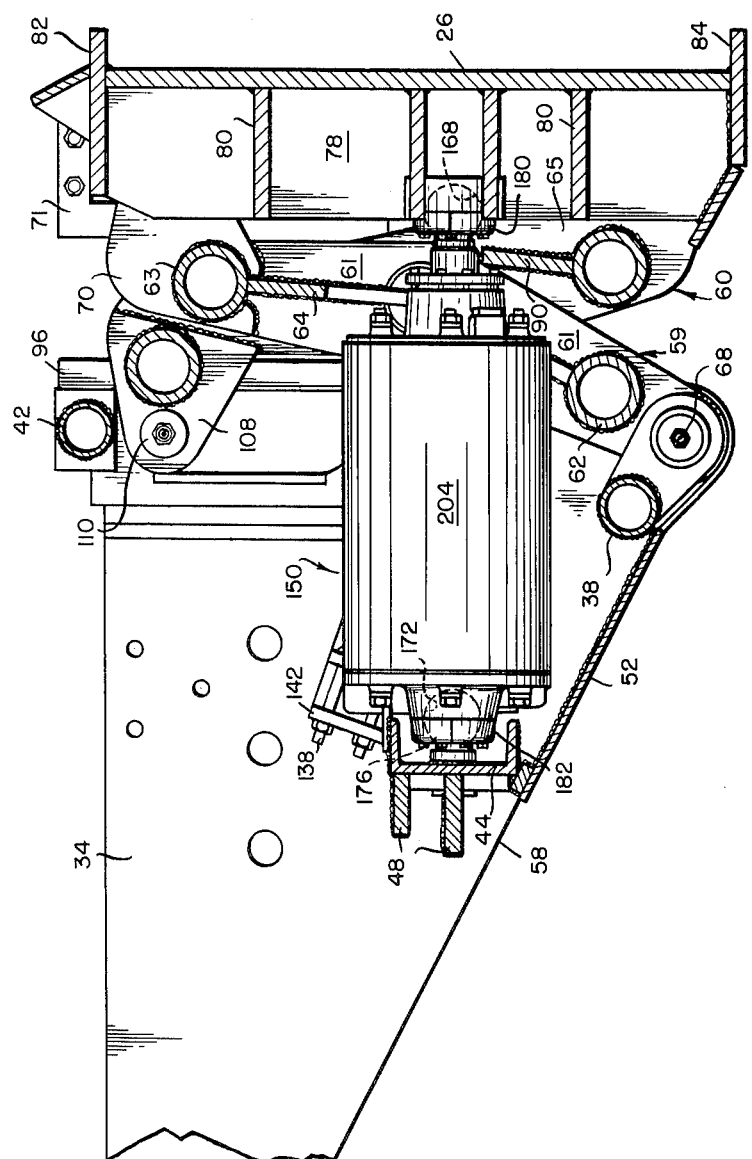
FIGURE 3 is a vertical sectional view through the pusher structure shown in FIGURE 1 with the plate in retracted position.
Figure 4:
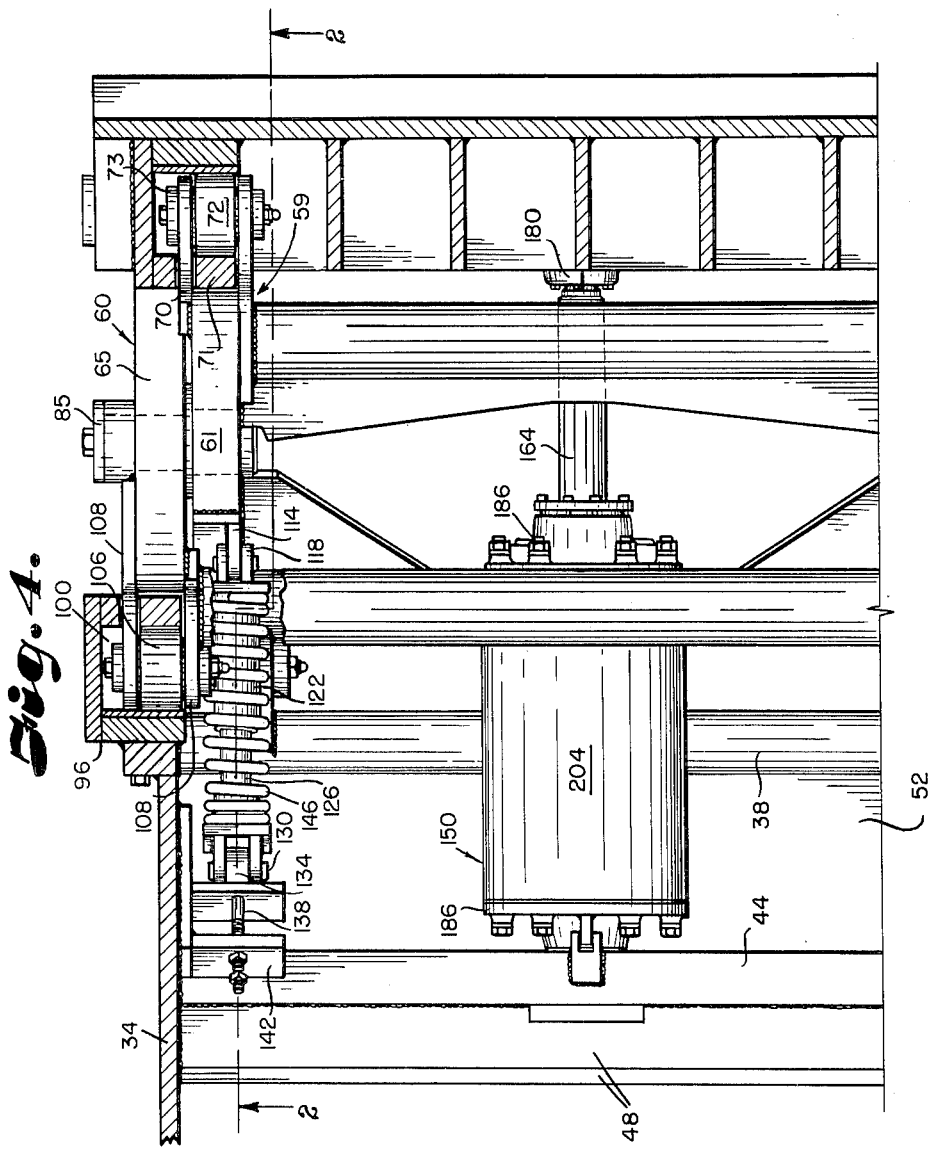
FIGURE 4 is a partial horizontal sectional view through the pusher structure, taken on line 4—4 of FIGURE 2.

Push plate 26 is carried in spaced relation to support plates 30 and 34 by two pivoted link members indicated generally at 59 and 60 in FIGURES 2, 3 and 4. Link member 59 is comprised of a pair of substantially parallel links 61 on opposite sides of the pusher attachment rigidly connected by spaced transverse bars 62 and 63 with gusset plates 64 secured to the bars and links to form a rigid substantially rectangular structure.

The rearward lower end of links 61 are pivotally mounted on suitable pivot pins 68 for swinging movement relative to the support between spaced ears 69 extending forwardly and downwardly from transverse member 38 and the lower and forward ends of the plates 30 and 34. Links 61 extend forwardly and upwardly from plates 30 and 34 and the other ends of each are provided with dual extensions 70 rigidly secured thereto and extending on opposite sides of respective guide members 71 which are fixed to the push plate 26 adjacent the upper portion thereof. A roller 72 is rotatably mounted between the respective ends of extensions 70 by means of pivot pins 73. Rollers 72 rollingly engage forward and rearward wear faces 74 and 75 of a slot 76 in guides 71.

Push plate 26 preferably is rectangular, arranged substantially vertical as shown in FIGURE 1, and is longer than the spacing between plates 30 and 34. A plurality of rearwardly extending vertical and horizontally spaced ribs 78 and 80 are fixed on the rear of plate 26 to form a grid-like reinforcement. The upper and lower edges of plate 26 are provided wtih forwardly extending flanges 82 and 84 respectively to form retaining strips tending to hold the plate in engagement with a plush block such as 18 as shown in FIGURE 1 when the vehicles are being operated over uneven or irregular ground. Flange 84 preferably extends rearwardly and is connected to vertical ribs 78 to further reinforce the plate structure.

The mid-portions of links 61 of the link member 59 are pivotally connected by pins 85 to the mid-portions of links 65 of link member 60. Links 65 are rigidly connected together and held in spaced relation by bars 86 and 88 and by a suitable gusset plate 90 connected to bar 88 and links 65. The lower forward ends of links 65 are pivotally connected by suitable pivot pins 92 to the lower portion of push plate 26 with the axes of pivot pins 92 parallel to and below the axes of roller 72 whereby the axes are in the same plane parallel to the plane of push plate 26.

Guide members 96 which are preferably substantially the same as guide members 71 are mounted on plates 30 and 34. Each has a slot 100 therein providing wear faces 102 and 104 adapted to be engaged by a roller 106 mounted in the upper rearward ends of links 65 by spaced extensions 108 which form bifurcated ends and straddle the forward portion of the guide members 96. Rollers 106 are rotatably mounted on pins 110, have axes parallel with the axes of pins 68 and are preferably in the same vertical plane parallel with the plane of wear faces 102 and 104 whereby the pivotal mountings and connections of link members 59 and 60 provide a parallel motion for movement of the push plate toward and away from support plates 30 and 34 with the link members rigidly connected to move together as one member to movably support the push plate for movement toward and away from the support without binding even though the moving force acting on the push plate is spaced laterally from the center thereof.

Links 61 each have rearwardly extending ears 114 on which are pivotally mounted ends 118 of sleeves 122. Sleeve 122 telescopingly receives an end of a rod 126 slidable therein. The other end of rod 126 is pivotally mounted on pins 130 carried by ears 134 adjustably supported by adjusting screws 138 on plates 142 extending upwardly from the cross member 44. A compression spring 146 around sleeve 122 and rod 126 between the end members thereof urges extension of the telescoping member. There is a telescoping member and spring structure on each side of the support arranged whereby each resiliently urges link member 59 in forwardly and downwardly swinging movement about the axis of pins 68, and due to the connection between the link members 59 and 60, the springs resiliently urge the push plate 26 forwardly away from the support plates 30 and 34.

Figure 5:
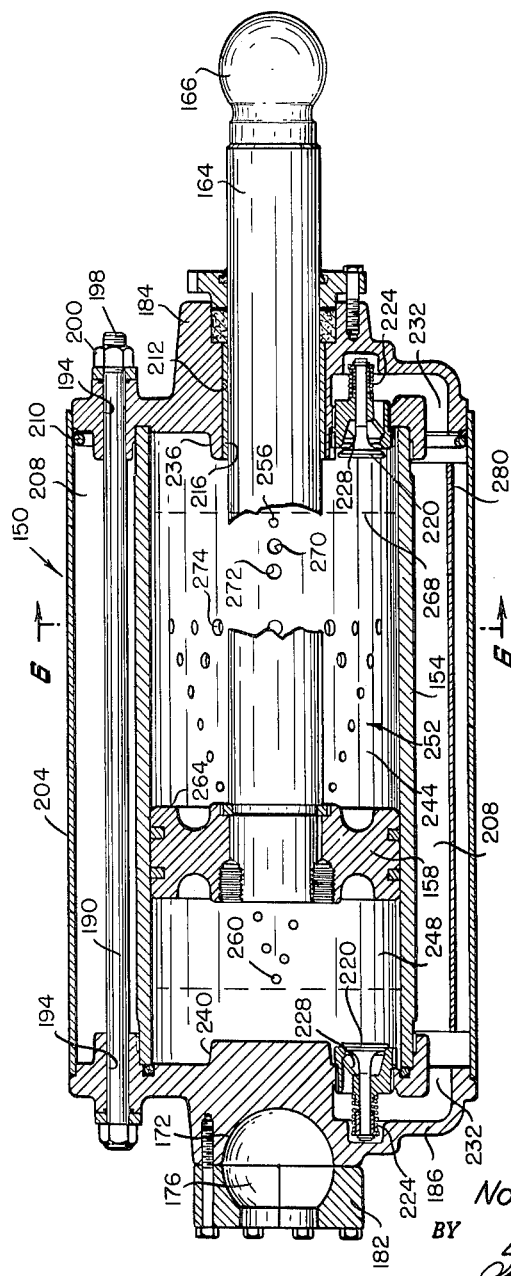
FIGURE 5 is a vertical sectional view through the hydraulic shock absorber member shown in FIGURES 1, 3 and 4.
Figure 6:
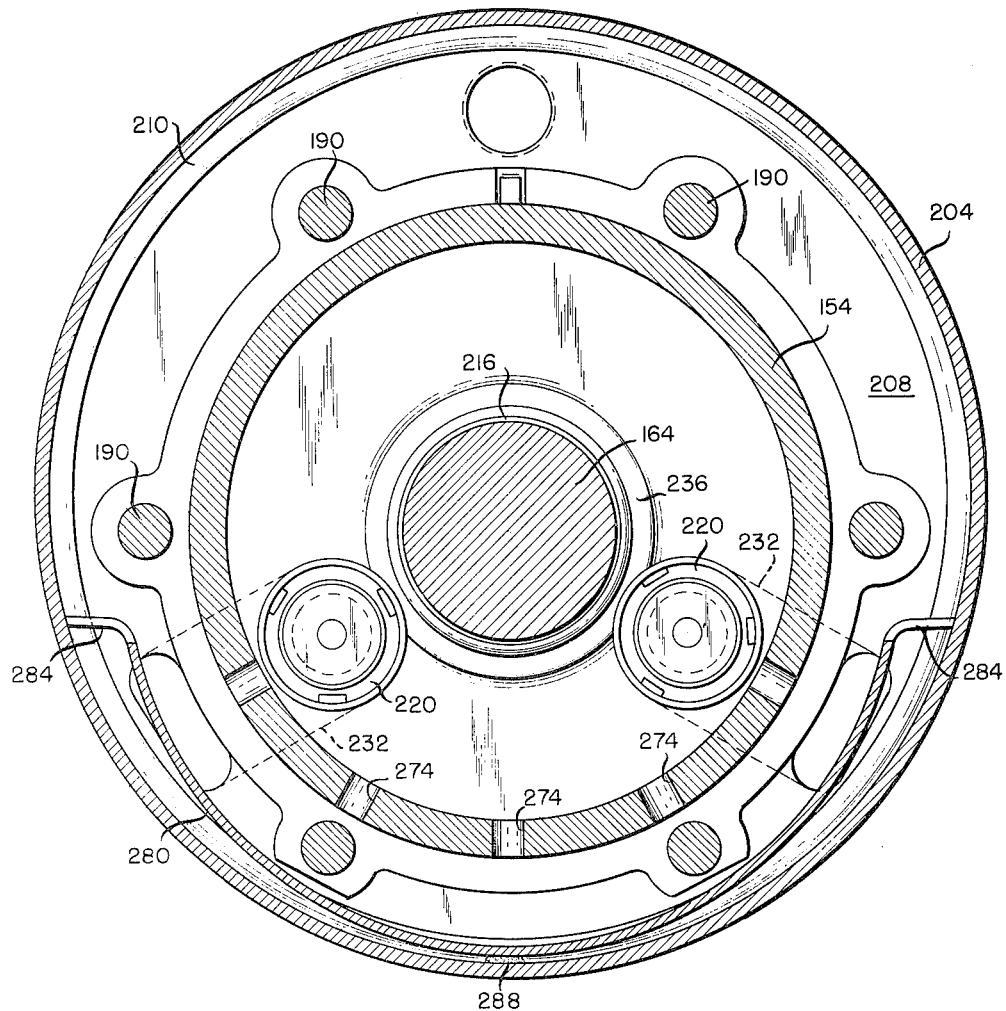
FIGURE 6 is a vertical sectional view taken along line 6—6 of FIGURE 5.

A single hydraulic shock cushioning or absorbing structure 150 shown in detail in FIGURES 5 and 6, is arranged between channel member 44 and push plate 26 substantially mid-way between side plates 30 and 34 with its axis longitudinal relative to the movement of push plate 26. The shock absorber is designed to provide progressively variably increasing resistance to rearward movement of plate 26 and, also, to provide a reverse cushioning effect as the push plate is urged forwardly into normal position by springs 146. The shock cushioning structure preferably consists of an apertured cylinder 154 with a piston 158 slidably mounted therein and rigidly connected to one end of a piston rod 164. The other end of rod 164 consists of a ball-shaped end 166 which universally engages a socket 168 mounted on the rear of push plate 26. On the opposite end of cylinder 154 is fixed a ball receiving socket 172 universally engaging ball 176 mounted on transverse channel member 44 and extending forwardly therefrom. Both ball elements 166 and 176 are retained in their respective sockets 168 and 172 by retainer plates 180 and 182 secured in place by suitable fastening devices. Sockets 168 and 172 are preferably positioned so that cylinder 154 is supported substantially in a horizontal position.

Cylinder 154 is closed at its ends by front and rear end members 184 and 186 respectively which are held in sealing engagement with the ends of the cylinder by suitable fastening devices such as bolts 190 which extend through aligned apertures 194 in the end members and have threaded ends 198 engaged by threaded nuts 200 to clamp the members against the cylinder ends.

A tubular shell 204 surrounds cylinder 154 in spaced relation thereto and has its ends sealingly engaged with end members 184 and 186 to form a fluid reservoir 208 around the cylinder sealed by O-ring 210. End member 184 has a bore 212 sealed by packing 216 extending therethrough in which piston rod 164 is slidably mounted. Each end member 184 and 186 has at least one end preferably two check valves 220 which are urged by springs 224 into closing relation to ports 228 which communicate through passages 232 with the reservoir 208 at the lower portion thereof.

Valves 220 close to prevent flow of fluid from cylinder 154 and open to permit flow of fluid from reservoir 208 to cylinder 154 in response to suction therein effected by movement of piston 158. End members 184, 186 have inwardly extending bosses 236 and 240 respectively which extend beyond a respective valve 220 to protect the latter from accidental engagement by the piston. Cylinder 154 and end members 184, 186 cooperate with piston 158 to form closed chambers 244 and 248 in the cylinder on opposite sides of the piston.

A plurality of spaced orifices or ports indicated generally at 252 in the bottom side of cylinder 154 provide communication between the interior of cylinder 154 and reservoir 208. Ports 252 are longitudinally spaced along the length of the cylinder (shown in detail in FIGURE 7) with the endmost ports 256 and 260 being spaced from end members 184 and 186 respectively. The end ports will be closed by piston 158 as it moves toward the adjacent end member while the piston is still spaced from boss 236 or 240. Ports 252 are arranged in the cylinder wall whereby the fluid level in reservoir 208 will always be above them at any position of the piston as when the level in the reservoir is lowered when the piston is at the end of its stroke where most of the piston rod is out of the cylinder.

When the piston is at the forward end of its stroke, surface 264 thereof will be positioned as shown by broken line 268 in FIGURE 5, and the body of the piston will cover ports 256, 270 and 272. As force is applied to piston rod 164 and the piston is forced rearwardly, fluid flow resistance from cylinder 154 to reservoir 208 will be at a minimum since maximum total port area will be available for fluid flow, and rapid initial movement of the piston will result. However, a sharp increase in fluid flow resistance and a like increase in the cushioning effect will occur as the piston passes over and closes the relatively large ports 274. Liquid moves into the cylinder behind the piston through valve 220 at the forward end of the cylinder and through the ports behind the piston. In the final phase of the rearward piston stroke, small ports 276, which are in staggered relation along cylinder 154, are covered one by one thereby reducing the number of ports communicating chamber 248 to reservoir 208 and gradually restricting flow of fluid and retarding the movement of the piston until port 260 is closed and a liquid cushion is developed in the rear end of cylinder 154 to prevent the piston from striking rear end member 186.

When the piston is moved forwardly in the cylinder due to the action of return springs 146, valves 220 in rear end member 186 open to allow the fluid to enter chamber 248 while fluid in chamber 244 is discharged through ports 252. Return of the piston is relatively free and easy since large ports 274 are open during most of the return stroke. This enables the return springs to quickly bias push plate 26 forward to maintain contact with the equipment being moved until it picks up speed and draws away from tractor 14. After the piston has returned through most of the cylinder length it closes ports 274 and thereby effects suddenly increased cushioning resistance since only ports 256, 270 and 272 remain open for passage of fluid to reservoir 208. These latter ports permit only slow movement of the piston until it covers them and comes to a stop in its original forward position.

Figure 7:
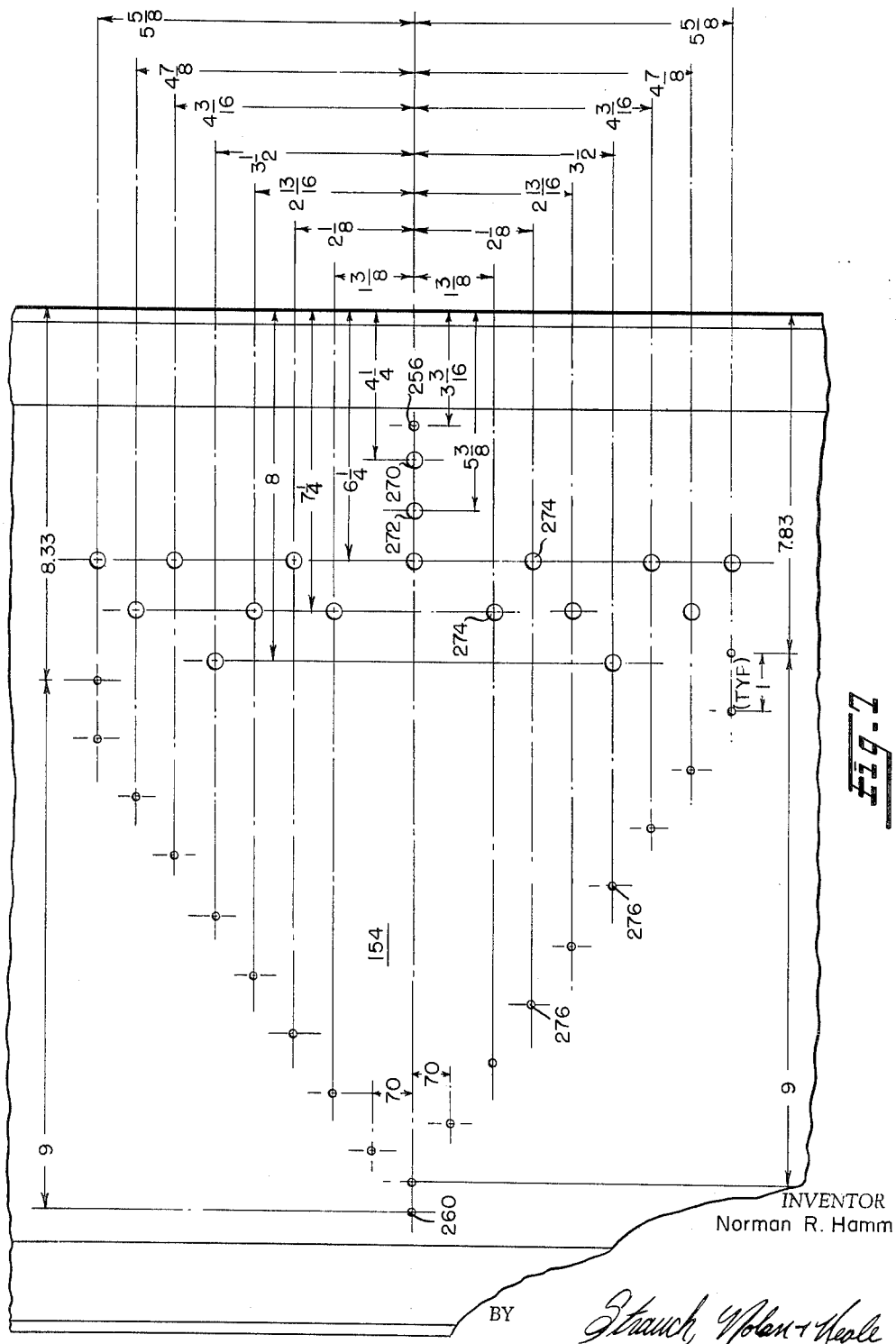
FIGURE 7 is a development view of a portion of the surface of cylinder 154 showing in detail the arrangement of ports in the apertured portion of the cylinder, and also showing by way of illustration the preferred dimensions of an arrangement found to produce the desired results.

To illustrate how best cushioning may be obtained from an arrangement of ports 252 in cylinder 154 with adequate cylinder wall strength to resist the high operational stresses and strains, dimensions are shown in FIGURE 7 for an arrangement empirically found to provide very effective results. By way of example, the dimensions shown in inches (FIGURE 7) are applicable to a cylinder having an internal diameter of between 8.065 and 8.075 inches, an external diameter of between 8.870 to 8.880 inches, and a length of between 19.980 and 20.000 inches. Ports 270, 272 and 274 are ⅜ inch diameter, and the remaining ports are .196 inch diameter. This specific arrangement is in highly successful use in pushing equipment for all available commercial sizes of Caterpillar tractors.

Appreciable wear on the shell 204 may result from impingement of the high pressure streams of fluid jetting from radially outwardly directed ports 252. A baffle plate 280 is therefore provided in reservoir 208 adjacent ports 252 to protect shell 204. As shown in FIGURES 5 and 6, the baffle, which is removable for replacement or for cleaning the reservoir, is tack welded or otherwise lightly secured in position. It is sufficiently large to cover the entire area of the pattern of ports 252 in cylinder 154. Baffle legs 284 at each end and double legs in the middle along the side edge of baffle 280 provide support and also space the baffle from shell 204. The baffle center portion curves down to the bottom center of shell 204 where it is lightly welded to the shell at 288.

In addition to protecting shell 204, baffle 280 also admits fluid to the space between it and shell 204, which being the lower internal space in the shock absorber, results in the deposition of dirt or other material carried by the reservoir fluid. Collection underneath the baffle removes the dirt from circulation and protects the equipment from wear which might otherwise result. When desirable for service purposes shell 204 and the accumulated dirt may be removed, and the shell replaced extending the useful life of the cylinder materially.

With pusher structure 10 supported on a tractor whereby push plate 26 will align with a pusher block 18 on a driven vehicle or scraper to be pushed, and with piston 158 at the forward end of its stroke, the structure will be positioned substantially as illustrated in FIGURE 2. The tractor is then moved behind the scraper and then forwardly to engage push plate 26 with pusher block 18. The impact resulting from the engagement and forward movement of the tractor causes piston 158 to move rearwardly in cylinder 154, link members 59 and 60 to pivot on pins 68 and 92 respectively, and rollers 72 and 106 move upwardly in slots 76 and 100 respectively, causing the push plate to move rearwardly toward the tractor 14, compressing springs 146. As the push plate moves rearwardly, the piston also moves rearwardly, progressively closing the ports 252 thereby reducing the ports through which fluid is forced from chamber 248 to reservoir 208 and increasing the resistance to further rearward movement of piston 158. Relative movement of piston 158 and cylinder 154 is rapid during the initial pushing movement and is gradually slowed as the piston approaches the rear end of the cylinder. When the last rearward port 260 is closed liquid is then trapped in the cylinder chamber 248 providing a substantially solid backing of trapped liquid to transmit the pushing force of the tractor through the cylinder and piston and piston rod to the push plate 26. When the pushing operations are completed, and the tractor and scraper are moved apart, springs 146 indirectly urge the piston 158 forwardly to return it to the position at the forward end of cylinder 154. Link members 59 and 60 in their pivoted and guided relation support push plate 26 for substantially parallel movement, and further provide support for the opposite sides of the push plate whereby even though the force exerted by the pusher against the pusher block is off center, there will be no binding or resistance in the linkage structure of free movement of the pusher plate member.

Figure 8:
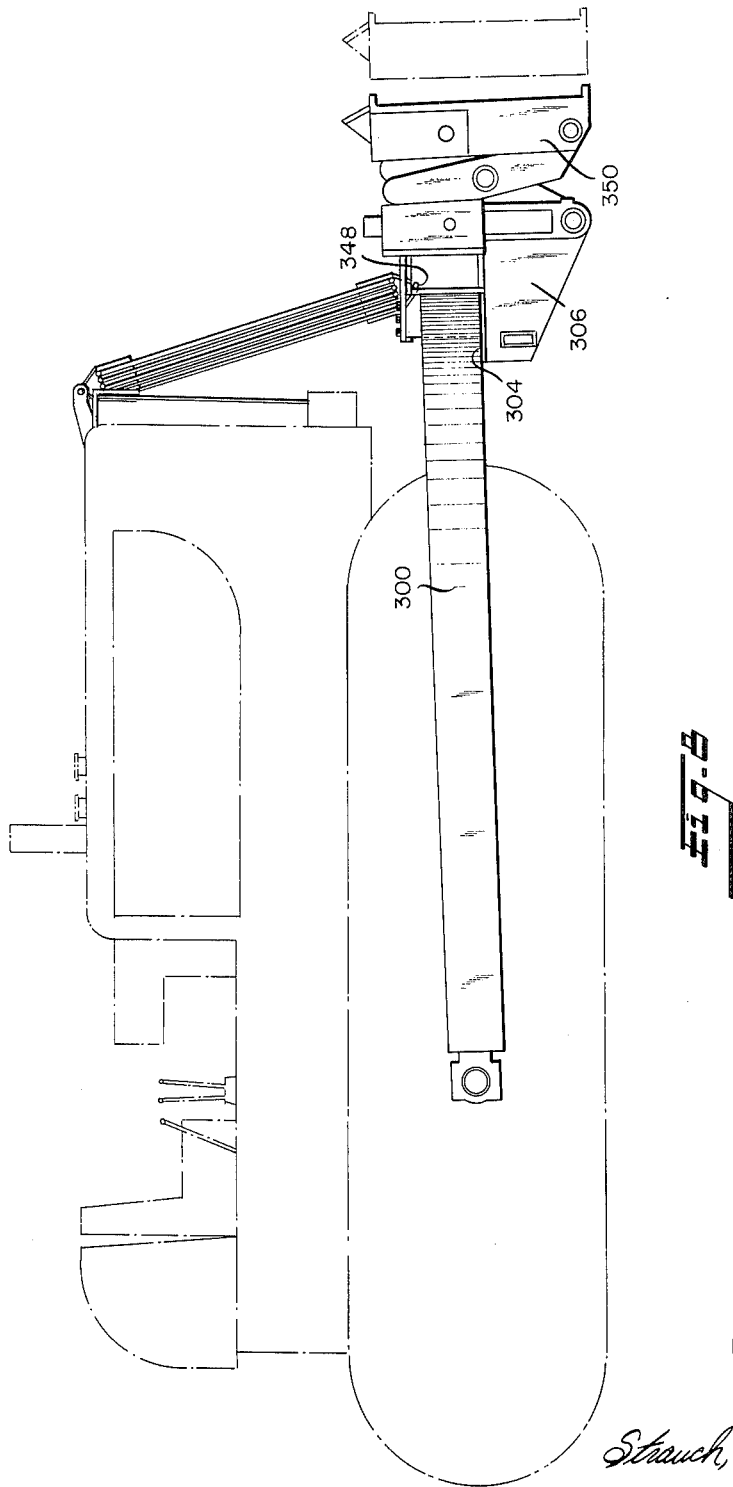
FIGURE 8 is a side elevation view of a tractor shown in phantom lines having a pusher mechanism made in accordance with the present invention attached to the C-frame thereof.
Figure 9:
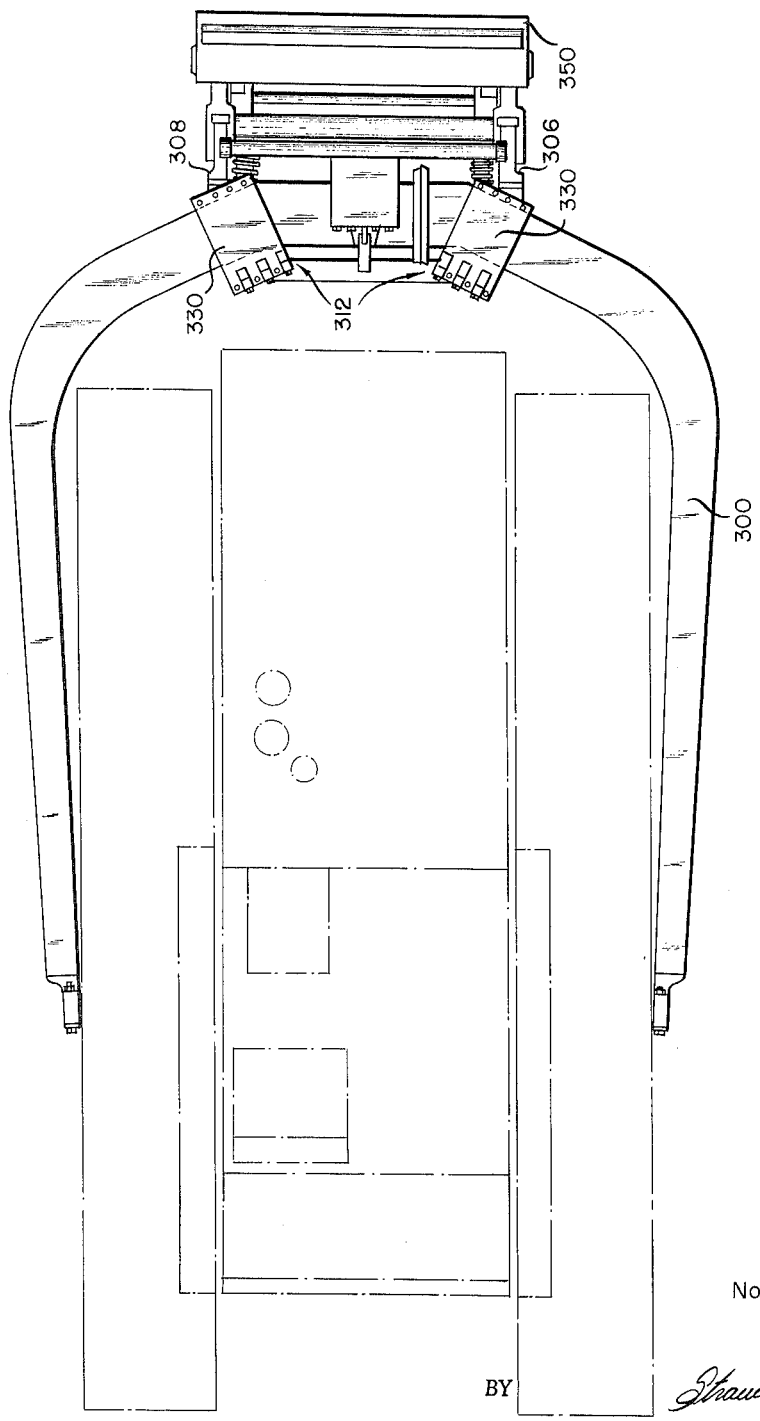
FIGURE 9 is a plan view of the tractor and pusher mechanism shown in FIGURE 8.
Figure 10:
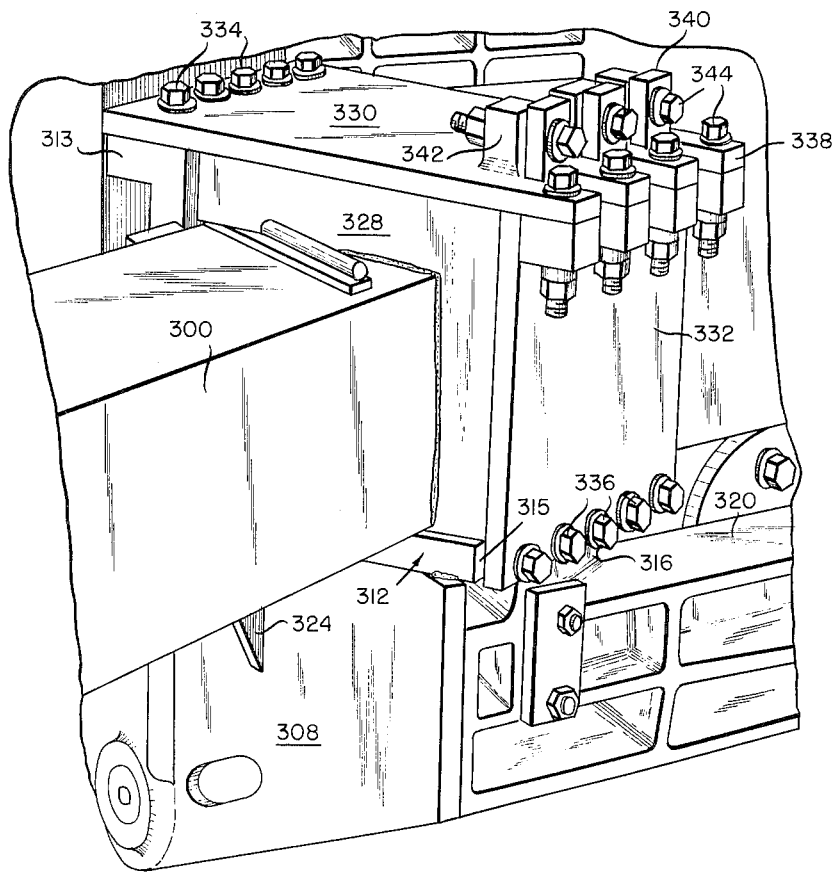
FIGURE 10 is a detailed perspective view of a portion of the mounting mechanism for mounting the pusher mechanism in FIGURES 8 and 9 to a C-frame, the view being taken forwardly from the left tractor tread through a line approximately through the center of the push plate to thereby illustrate the rear portions of the mounting mechanism.

Instead of mounting the pusher attachment shown in FIGURE 1 directly to the body of a tractor, it may be desirable to secure the attachment to a conventional tractor C-frame 300 as illustrated in FIGURES 8, 9 and 10. For this mounting the rear section of the pusher attachment is modified by forming large C-frame receiving notches 304 cutout of side support plates 306 and 308.

A Z-shaped bearing plate indicated generally at 312, supported by a brace 316 on channel member 320, is rigidly secured in each notch 304 and engages the bottom and forward surfaces of C-frame 300.

The top horizontal leg 313 is relatively short and is provided with threaded bolt bores on its end surface 315. A plurality of reinforcement pieces such as 324 are welded to both horizontal and vertical legs of plate 312. Two L-shaped filler panels 328 are welded to the C-frame over the two side edges of each plate 312.

A pair of interlocking clamp plates 330 and 332 are rigidly fixed to each Z-shaped plate 312 as by bolts 334 and 336. Plates 330 and 332 are each provided with finger extensions 338 and 340 respectively, at one end thereof, which fingers are arranged so as to interengage plates 330 and 332 as shown in FIGURE 10. Bolts 344 extending through the ends of each finger 338, 340 and lugs 342 welded on the clamp plates adjacent each finger extension, secure the fingers of each clamp plate to the other clamp plate where a very strong interlocking engagement of C-frame 300 is produced.

As shown in FIGURE 8, the tractor hoisting mechanism may be attached to a pivoted eye 348 for effecting vertical adjustment of push plate 350.

FIGURE 9 illustrates the angular relation of clamp plates 330 and Z-shaped plates 312 having sides substantially parallel to plates 330 with respect to push plate 350. The angular relationship is chosen so that plates 312 and 330 will be substantially normal to the section of C-frame 300 which they engage.

In FIGURES 11, 12, 13, and 14, a relatively easily constructed and economical embodiment of the present invention is shown which includes a push plate 400, a pusher attachment body section comprising a pair of side guide frames indicated generally at 402, a hydraulic shock absorber 404 of the type described in connection with the embodiment of this invention shown in FIGURE 1, and linkage mechanism to be described in detail connecting push plate 400 to the pusher attachment body section for guided movement relative thereto.

Figure 11:
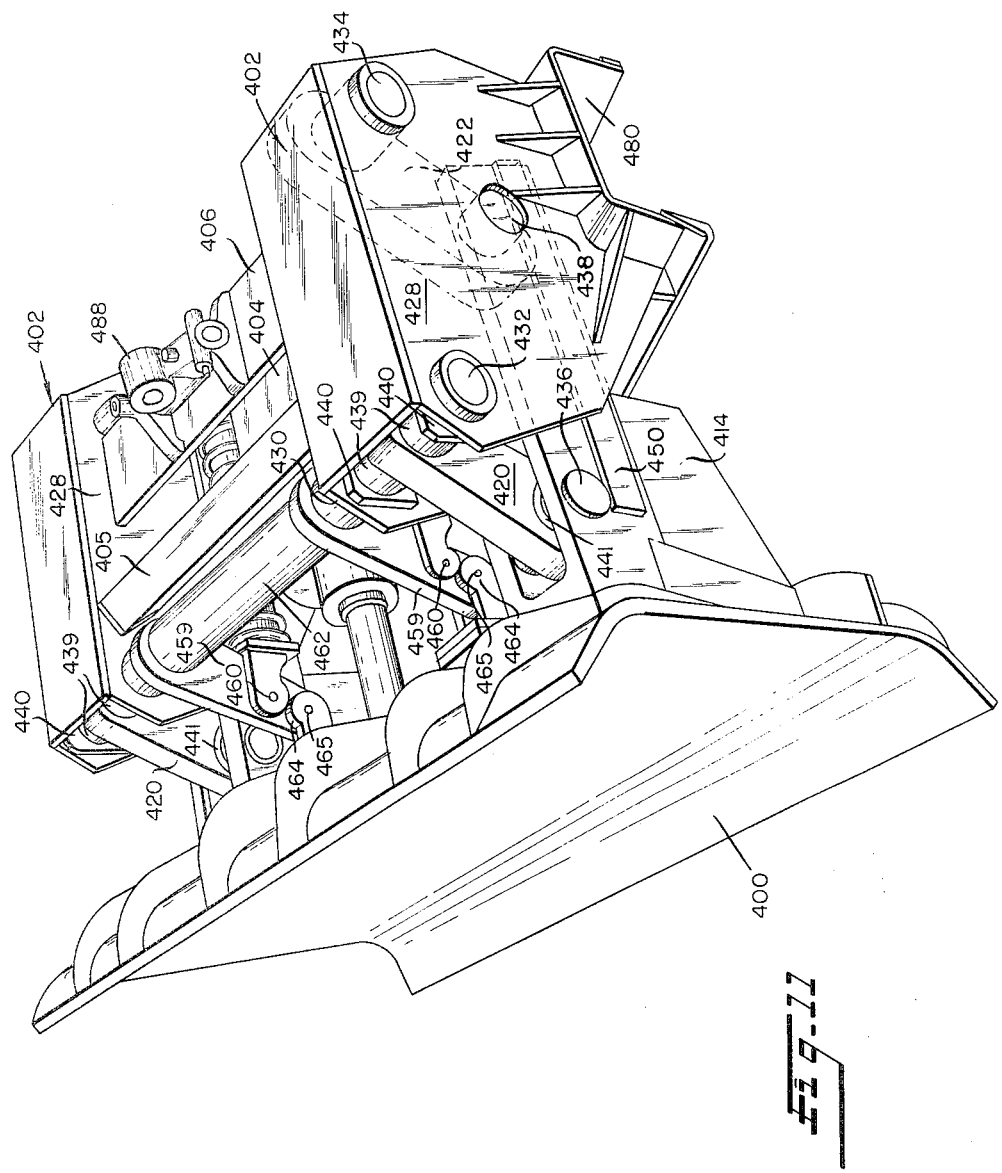
FIGURE 11 is a perspective view of another embodiment of the present invention adapted for mounting on the C-frame of the tractor.
Figure 12:
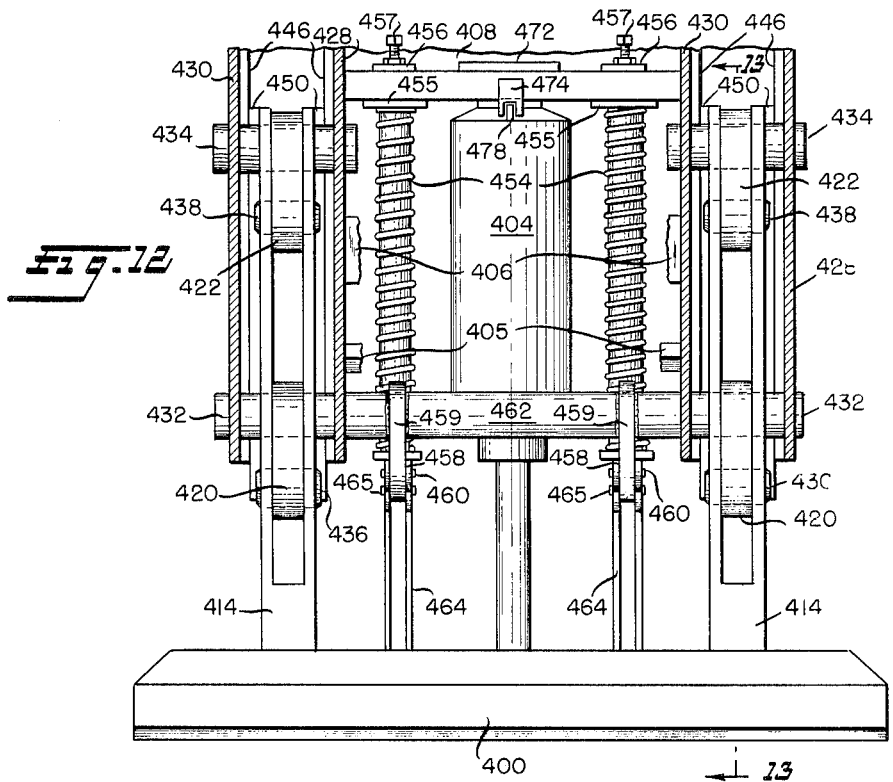
FIGURE 12 is a diagrammatic plan view of the pusher mechanism illustrated in FIGURE 11 illustrating the operating principles thereof.
Figure 13:
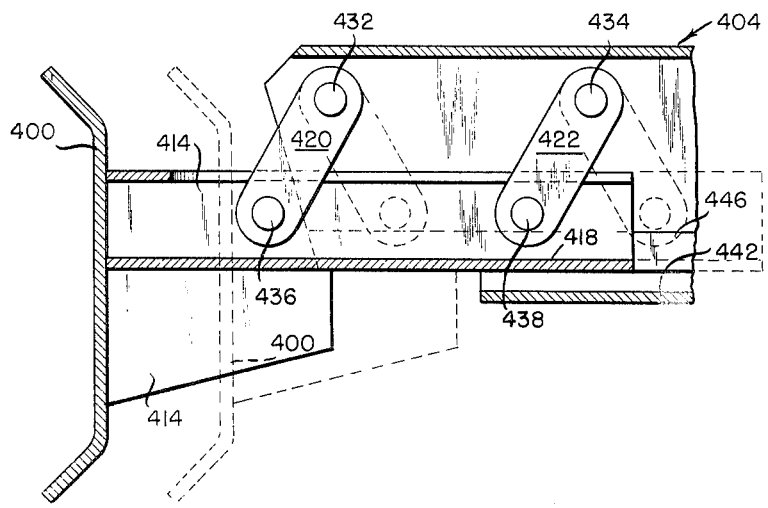
FIGURE 13 is a diagrammatic side section view taken along line 13—13 of FIGURE 12 illustrating the operating structure of the embodiment of this invention shown in FIGURE 11.

Referring specifically to FIGURES 11, 12 and 13, guide frames 402 are held in fixed spaced relation by a substantially rectangular transverse bar 405, an L-shaped transverse support 406 reinforced by plates 407, and a rugged rear transverse beam 408. Plate 400 has spaced elongated guide lugs 414 extending rearwardly at substantially right angles thereto. Each lug 414 has a pair of substantially vertical side walls and a bottom plate (such as 418 shown in FIGURE 13) and each is pivotally connected to a pair of substantially parallel suspension arms 420 and 422.

Arms 420 and 422 are pivotally fixed near the upper edges of guide frame sides 428 and 430 by pins 432 and 434 respectively, and extend downwardly between the side walls of lug 414 where they are pivotally secured to the lugs by pins 436 and 438 respectively. Arms 420 are mounted on pins 432 between spacers 439 and reinforcement 440, and on pins 436 between spacers 441. Arms 422 are similarly mounted between spacers (not shown) on pins 434 and 436. The spacers insure uniform pivotal movement of the arms in the same plane, eliminate undesirable play in the heavy equipment, and maintain each set of arms in alignment through repeated use.

Arms 420 and 422 are substantially parallel and of substantially the same length. As illustrated diagrammatically in FIGURE 13, arms 420 and 422 are shown in full lines suspending plate 400 in its forward or normal position while the dotted line position illustrates the rearward position of the plate and arms. As is apparent, the arms swing thorugh an arc as the plate moves relative to guide frames 402; therefore the arms are of sufficiently short length to space bottom wall 418 of guide lugs 414 from bottom surface 442 of the guide frames to permit a full arcuate swing of arms 420 and 422 without binding.

Guide frames 402 have a pair of guideways 446 best illustrated in FIGURES 12 and 14 which are elongated rectangular plates fixed to and extending throughout the length of the lower inner portion of side walls 428 and 430. The inner vertical surfaces of guideways 446 are relatively smooth and cooperate with guide bars 450 which are also elongated rectangular plates fixed to the lower outer side surfaces of lugs 414.

Guide bars 450 and guideways 446 with smooth mating surfaces, which are preferably lubricated, provide strong guiding support prohibiting any significant lateral deviation from a straight rearward path of plate 400 and lugs 414, which deviation could cause binding or severe wear damage of the heavy attachment mechanism.

Plate 400 is maintained in its normal forward position by a pair of compression springs 454. Each spring is mounted on beam 408 by mounting plates 455, 456 and adjustment screws 457 (FIGURE 14) and mounted over a telescoping rod and sleeve indicated generally at 458 pivotally connected to lever arms 459 by pins 460. Rod and sleeve 458 is similar to the return spring rod and sleeve shown and described in connection with the embodiment of this invention shown in FIGURE 2.

Levers 459 are non-rotatably fixed to a torsion bar 462 which is a tubular transverse element having each of its ends mounted for pivotal movement in one of the inner sides of guide frames 402 in a manner so that its central longitudinal axis is substantially coextensive with the axes of pins 432. In fact, bar 462 may be an intermediate continuation of pins 432 if desired. The lower ends of levers 459 are received in bifurcated lugs 464 and pinned thereto by pins 465. The bifurcated lugs are rigidly secured to the rear portion of plate 400.

Levers 459, bar 462 and bifurcated lugs 464 cooperate to provide still further means for insuring uniform parallel movement of plate 400 when it is deflected from its normal position. Thus, in the event a non-uniform load or a laterally off-center load is applied to plate 400, the bifurcated lug on the side of the plate where the force is applied will tend to force the lower portion of lever 459 to which it is connected rearwardly. And since the lever is non-rotatably secured to bar 462, like movement will be imparted to the other lever, and consequently, to the other side of plate 400 whereby the effects of a symmetrical load on plate 400 is equalized and uniform, parallel movement of the plate is effected.

For ease in assembling this embodiment of the invention, beam 408 (FIGURE 14) is provided with apertures 470 which also extend through reinforcement plate 472. Once shock absorber 404 is positioned, bolts extending through the vertical portion of beam 408 may be inserted and tightened therein.

To aid in proper alignment of the shock absorber and to maintain such alignment a slotted bracket 474 is fixed to the upper surface of beam 408 for engaging a vertical alignment ear 478 on the rear face of the shock absorber.

To mount this shock cushioning assembly on a conventional tractor C-frame, or the like, U-shaped mounting members 480 are provided which are similar to those described in connection with the mounting assembly shown in FIGURES 8, 9 and 10.

The mounting members are angled slightly to conform with the shape of a conventional C-frame, and are adapted to be clamped to such a frame by clamp plates (not shown) and bolts extending through apertures 484.

A pivoted eye 488 is provided on transverse support 406 for attachment to a tractor hoist or other suitable gear for vertical positioning of plate 400.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A pusher connection for transmitting a pushing force between a driving and driven vehicle, comprising:
  (a) a push frame including a plurality of spaced transversely extending members and rearwardly extending members adjacent opposite end portions of said transverse members for mounting said push frame on a driving vehicle;
  (b) a push plate having an outer pushing surface adapted to engage a push block supported on a driven vehicle to be pushed;
  (c) first link means having arms pivotally connected to the push frame;
  (d) second link means having arms pivotally connected to the push plate in horizontal alignment of the pivotal mounting of said first link means;
  (e) means pivotally connecting said first and second link means in spaced relation to the pivotal connections thereof to the push frame and push plate;
  (f) extensions on each of the first and second link means extending oppositely from the respective pivotal mountings of said respective link means;
  (g) means slidably connecting the extensions of said first and second link means with the push plate and push frame respectively whereby said link means support the push plate for movement toward and away from the push frame;
  (h) resilient means carried by the push frame and urging the push plate away from said push frame;
  (i) a cylinder and piston assembly having a piston rod extending from one end of the cylinder thereof;
  (j) means pivotally connecting the piston rod to one of the push frame and push plate;
  (k) means pivotally connecting the cylinder to the other of the push frame and push plate;
  (l) a shell surrounding the cylinder and defining a fluid reservoir;
  (m) a plurality of small orifices communicating the reservoir with the cylinder at spaced points along the length of said cylinder whereby force of the driving vehicle tending to push the driven vehicle effects movement of the push plate toward the push frame and moves the piston longitudinally of the cylinder in a direction toward an end thereof forcing fluid through the flow passages between the piston and said end of the cylinder, said piston movement progressively reducing the number of flow passages having communication with the cylinder between the piston and cylinder end toward which the piston is moving thereby retarding discharge of fluid from said cylinder and offering increased resistance to contractive movement of the piston and cylinder; and
  (n) means including valves adjacent ends of the cylinder communicating the respective end of the cylinder with the fluid reservoir and operative for flow of fluid from said reservoir to the respective cylinder end when the piston is moving away from the respective cylinder end and the resistance to relative movement of the piston and cylinder is that offered by the retarded flow of fluid through said flow passages between the piston and the other end of the cylinder.

2. A pusher connection for transmitting a pushing force between a driving and driven vehicle, comprising:
  (a) a pushing member including a pushing plate having an outer flat pushing surface adapted to engage a push block supported by a driven vehicle to be pushed;
  (b) support means for said push member to carry same upon a driving vehicle for movement toward and away from said driving vehicle, said support means including a support frame having transversely extending portions with laterally spaced upright portions, said pushing plate having rearwardly extending upright portions, said upright portions on said frame and plate having guide portions in substantially parallel relation one to the other;
(c) a first link member extending laterally between said frame and said plate and having one end pivoted to the support frame in vertical alignment with the guide portion thereon and the other end movably engaged with the guide portion on said push plate;
(d) a second link member extending laterally between the frame and the plate and having one end pivotally connected to the plate in vertical alignment with the guide portion on said plate and the other end movably engaged with the guide portion of the supporting frame;
(e) means pivotally connecting said first and second link members for relative swinging movement of the ends thereof whereby said plate is supported for substantially parallel movement toward and away from the support frame;
(f) a cylinder and piston assembly having a piston rod extending from one end of the cylinder thereof;
(g) means connecting one end of the cylinder and piston rod to the support frame and the other to the push member;
(h) a fluid reservoir;
(i) a plurality of relatively small flow passages communicating the reservoir with the cylinder at spaced points along the length of said cylinder whereby force acting on the push member tending to move the push member toward the support frame effects movement of the piston longitudinally of the cylinder in a direction toward an end thereof forcing fluid through the flow passages between the piston and said end of the cylinder; and
(j) means including valves adjacent ends of the cylinder communicating the respective end of the cylinder with the fluid reservoir and operative for flow of fluid from said reservoir to the respective cylider end when the piston is moving away from the respective cylinder end and the resistance to relative movement of the piston and cylinder is that offered by the retarded flow of fluid through said flow passages between the piston and the other end of the cylinder.

3. A pusher connection for transmitting a pushing force between a driving and driven vehicle, comprising:
(a) a pushing member including a substantially flat perpendicular plate having an outer flat pushing surface adapted to engage a push block supported by a driven vehicle to be pushed, said flat plate having flange portions at edges thereof to resist disengagement of said plate and push block;
(b) support means for said push member to carry same upon a driving vehicle for movement toward and away from said driving vehicle, said support means including a support frame having transversely extending portions with laterally spaced upright portions, said pushing plate having rearwardly extending upright portions, said upright portions on said frame and plate having guide portions in substantially parallel relation one to the other;
(c) a first link member extending laterally between said frame and said plate and having one end pivoted to the support frame below and in alignment with the guide portion thereon and the other end movably engaged with the guide portion on said push plate;
(d) a second link member extending laterally between the frame and the plate and having one end pivotally connected to the plate below and in alignment with the guide portion on said plate and the other end movably engaged with the guide portion of the supporting frame;
(e) means pivotally connecting said first and second link members for relative swinging movement of the ends thereof whereby said plate is supported for substantially parallel movement toward and away from the support frame;
(f) resilient means between the support frame and one link member and acting thereon to urge the push plate away from the support frame;
(g) a cylinder and piston assembly having a piston rod extending from one end of the cylinder thereof;
(h) means connecting the other end of the cylinder to one of the support frame and push members;
(i) means connecting the piston rod to the other of the support member and push member;
(j) a fluid reservoir surrounding the cylinder;
(k) a plurality of relatively small flow passages communicating the reservoir with the cylinder at spaced points along the length of said cylinder whereby force acting on the push member tending to move the push member toward the support frame effects movement of the piston longitudinally of the cylinder in a direction toward an end thereof forcing fluid through the flow passages between the piston and said end of the cylinder, said piston movement progressively reducing the number of flow passages having communication with the cylinder between the piston and cylinder end toward which the piston is moving thereby retarding discharge of fluid from said cylinder and offering increased resistance to contractive movement of the piston and cylinder; and
(l) means including valves adjacent ends of the cylinder communicating the respective end of the cylinder with the fluid reservoir and operative for flow of fluid from said reservoir to the respective cylinder end when the piston is moving away from the respective cylinder end and the resistance to relative movement of the piston and cylinder is that offered by the retarded flow of fluid through said flow passages between the piston and the other end of the cylinder.

4. A pusher connection for transmitting a pushing force between a driving and driven vehicle, comprising:
(a) a mounting member for attachment to a driving vehicle frame;
(b) a pushing member including a plate portion extending transversely in front of said driving vehicle and having movement toward and away from said mounting member, said push plate portion having a forward surface adapted to engage a push block carried by a driven vehicle to be pushed;
(c) a pair of guide members rigidly connected to opposite end portions of said push plate portion and extending rearwardly therefrom and defining substantially vertical parallel ways;
(d) a pair of laterally spaced guide members rigidly connected to said mounting member and extending forwardly therefrom and defining substantially vertical parallel ways;
(e) a pair of laterally spaced link members each having one end pivotally connected to the push member in vertically spaced relation to the pair of guide members on said push member;
(f) means rigidly connecting said pair of link members for pivotal movement in unison;
(g) means on the other ends of said pair of link members movable in the ways of the pair of guide members on said mounting member;
(h) a second pair of laterally spaced link members each having one end pivotally mounted on the mounting member in vertically spaced relation to the pair of guide members on said mounting member;
(i) means rigidly connecting said second pair of link members whereby they pivot in unison;
(j) means on the other ends of said second pair of link members movable in the ways of the guide members on said push member;
(k) means pivotally connecting the first-named pair of link members with said second pair of link members intermediate their respective ends whereby said pairs of link members support said push member for limited movement toward and away from the mounting member and resist transverse and vertical tilting thereof; and (1) cushioning means between the mounting member and push member for resiliently cushioning movement of the push member toward the mounting member.

5. A pusher attachment for smoothly transmitting pushing forces between a driving and a driven vehicle comprising:

(a) a push member;

(b) means for securely mounting said pusher attachment on a vehicle;

(c) means for so connecting said push member to said mounting means that said member may move relative to said mounting means toward and away from said vehicle; and (d) a hydraulic cylinder assembly between said mounting means and said push member for transmitting the pushing forces therebetween and smoothing these forces by a controlled dissipation of the varying amount of the pushing force energy and for cushioning movement of said push member away from said vehicle, comprising:

(1) a cylinder adapted to contain hydraulic fluid;

(2) a piston movable in said cylinder between a first limit position adjacent one end of said cylinder and a second limit position adjacent the second end of said cylinder;

(3) means for so connecting said piston to said push member that said piston is in said first limit position when said push member is furthest from said vehicle and in said second limit position when said push member is nearest said vehicle, whereby a force exerted on said push member will be transmitted to and move said piston from said first limit position to said second limit position; and (4) means biasing said push member away from said vehicle, whereby said biasing means will exert a force on said piston to move said piston from said second to said first limit position subsequent to the exertion of a force on said push member moving said piston from said first toward said second limit position; and (5) means for so controlling the shock absorbing movement of said piston from said first to said second limit position as to slowly decrease the velocity of the piston during a first relatively short portion of said movement and to thereafter more rapidly decrease the velocity of said piston during the remainder of said shock absorbing movement and for so controlling the return movement of said piston from said second to said first limit position by said biasing means as to increase the velocity of said piston during a first relatively long portion of said movement and to thereafter rapidly decrease the velocity of said piston during the remainder of said movement, said last-named means comprising:

(a) a hydraulic fluid reservoir;

(b) means including a plurality of ports in said cylinder providing fluid communication between the interior of said cylinder and said fluid reservoir, said ports being so sized and located relative to said piston that said piston covers selected ones of said ports and rapidly decreases the total port area during the first portion of the shock absorbing movement of the piston and thereafter covers other of said ports and slowly decreases the total port area during the remainder of the shock absorbing movement and so sized and located relative to said limit positions that a relatively large number of said ports are uncovered during a first, relatively long portion of the return movement of said piston to permit rapid movement of said piston toward said first limit position and selected ones of said ports are covered by said piston during the remainder of said stroke to rapidly decrease said total port area.

6. A pusher attachment as defined in claim 5, wherein said mounting means comprise means for receiving a vehicle member therein having clamp means adapted to be secured about said vehicle member whereby said attachment is secured.

7. A pusher attachment as defined in claim 6, wherein said clamp means comprise at least two clamp plates having interlocking fingers, said plates being secured to each other at one end thereof and to said receiving means at their other ends.

8. A pusher attachment as defined in claim 5, said mounting means comprising spaced guide frames at the rear of said pusher attachments and means for fixedly securing said mounting means to a vehicle, said push member including guide means fixed thereto and extending rearwardly into and cooperating with said guide frames for controlling the relative movement of said push member with respect to said mounting means, and said connecting means including a plurality of link means pivotally interconnecting said guide frames and said guide means to suspend said push member from said guide frames for swinging movement relative thereto.

9. A pusher attachment as defined in claim 8 together with a pivoted rod mounted between said guide frames and non rotatably attached at each of its opposite ends to a pair of said link means located on opposite sides of the central axis of said pusher attachment, said pair of link means being pivotally connected to said push member guide means at the other end thereof.

10. A pusher attachment as defined in claim 5, said mounting means comprising spaced guide frames at the rear of said pusher attachment and means for fixedly securing said mounting means to a tractor, said push member including guide means fixed thereto to extend rearwardly into said guide frames, and said connecting means including at least two suspension arm members pivoted to said guide frames and to said guide means.

11. A pusher attachment as defined in claim 5 together with a shell member around said cylinder forming said fluid reservoir and a curved baffle plate in said reservoir adjacent said ports to protect said shell from impingement of fluid from said ports and to collect sediment from said fluid.

12. A pusher attachment as defined in claim 5, wherein said ports are arranged to completely cut off fluid flow from said cylinder as said piston approaches the end of its travel to compressively trap hydraulic fluid in the ends of said cylinder.

13. A pusher attachment as defined in claim 5, wherein said ports are disposed in a longitudinally stepped arrangement of sections comprising a first relatively short section of ports at said one end of said cylinder constituting a relatively small portion of the total port area, a second relatively short intermediate section adjacent said first port section constituting a relatively large portion of the total port area, and a third relatively long section extending from said intermediate section toward the second end of the cylinder constituting the remainder of the total port area, said first port section being so located relative to said first limit position that the ports in said section are closed by said piston with the latter in is first limit position.

14. A pusher attachment for transmitting a pushing force between a driving and driven vehicle comprising:
(a) a mounting member for attachment to a driving vehicle;
(b) a push member extending transversely in front of said driving vehicle and having movement toward and away from said mounting member, said push member having a surface adapted to engage a portion of a vehicle to be pushed;
(c) a first pair of laterally spaced link members each having one end pivotally connected to the push member and the other end pivotally and translatably connected to said mounting member;
(d) a second pair of laterally spaced link members each having one end pivotally mounted on the mounting member and the other end pivotally and translatably connected to said push member;
(e) means rigidly connecting one of said pair of link members together whereby they pivot in unison;
(f) means pivotally connecting eachof said first pair of link members with adjacent ones of said second pair of link members intermediate their respective ends whereby said pairs of link members support said push member for substantially linear movement toward and away from the mounting member; and
(g) cushioning means between the mounting member and push member for cushioning movement of the push member toward the mounting member.

15. A pusher attachment for transmitting a pushing force between a driving and driven vehicle comprising:
(a) a mounting member for attachment to a driving vehicle;
(b) a push member extending transversely in front of said driving vehicle and having movement toward and away form said mounting member, said push member having a surface adapted to engage a portion of a vehicle to be pushed;
(c) a first pair of laterally spaced link members each having one end pivotally and slidably connected to the push member and the other end pivotally fixed to said mounting member;
(d) a second pair of laterally spaced link members each having one end pivotally and slidably connected to the mounting member and the other end pivotally fixed to said push member;
(e) means rigidly connecting one of said pairs of link members together whereby they pivot in unison;
(f) means pivotally connecting each of said first pair of link members with corresponding ones of said second pair of link members intermediate their respective ends whereby said pairs of link members support said push member for substantially linear movement toward and away from the mounting member; and
(g) cushioning means between the mounting member and push member for cushioning movement of the push member toward the mounting member.

16. A pusher attachment for transmitting a pushing force between a driving and driven vehicle comprising:
(a) a push member extending transversely in front of said driving vehicle and having movement toward and away from said driving vehicle, said push member having a surface adapted to engage a portion of a vehicle to be pushed;
(b) a first pair of laterally spaced link members each having one end pivotally and slidably connected to the push member and the other end pivotally fixed relative to said driving vehicle;
(c) a second pair of laterally spaced link members each having one end pivotally and slidably connected relative to the driving vehicle and the other end pivotally fixed to said push member;
(d) means rigidly connecting one of said pairs of link members together whereby they pivot in unison;
(e) means pivotally connecting each of said first pair of link members with corresponding ones of said second pair of link members whereby said pairs of link members support said push member for substantially linear movement toward and away from the driving vehicle; and
(f) cushioning means between the driving vehicle and push member for cushioning movement of the push member toward the driving vehicle.

References Cited by the Examiner
UNITED STATES PATENTS

| | | | |
|---|---|---|---|
| 2,805,881 | 9/1957 | Blake | 293—86 |
| 2,919,142 | 12/1959 | Winget | 280—481 |
| 2,977,146 | 3/1961 | Edwards et al. | 293—86 X |
| 2,999,697 | 9/1961 | Winget | 280—481 |

BENJAMIN HERSH, *Primary Examiner.*

LEO FRIAGLIA, *Examiner.*